(12) United States Patent
Sietsema

(10) Patent No.: US 8,112,930 B2
(45) Date of Patent: Feb. 14, 2012

(54) FIREARM WITH ENHANCED CORROSION AND WEAR RESISTANCE PROPERTIES

(75) Inventor: Glen D. Sietsema, Mohawk, NY (US)

(73) Assignee: RA Brands, L.L.C., Madison, NC (US)

( * ) Notice: Subject to any disclaimer, the term of this patent is extended or adjusted under 35 U.S.C. 154(b) by 473 days.

(21) Appl. No.: 11/341,805

(22) Filed: Jan. 27, 2006

(65) Prior Publication Data
US 2006/0265926 A1 Nov. 30, 2006

Related U.S. Application Data

(60) Provisional application No. 60/647,926, filed on Jan. 27, 2005.

(51) Int. Cl.
*F41A 21/02* (2006.01)
(52) U.S. Cl. .............. 42/76.02; 89/14.7; 42/78
(58) Field of Classification Search ........... 42/76.02, 42/78; 89/14.7
See application file for complete search history.

(56) References Cited

U.S. PATENT DOCUMENTS

| | | | |
|---|---|---|---|
| 1,866,218 A | 11/1932 | Olin et al. | |
| 2,767,464 A * | 10/1956 | Nack et. al. | 428/667 |
| 2,799,959 A | 7/1957 | Osborn | |
| 2,847,786 A * | 8/1958 | Hartley et al. | 42/76.01 |
| 3,112,553 A | 12/1963 | Safranek | |
| 3,503,787 A | 3/1970 | Pendse | |
| 3,523,035 A | 8/1970 | Whitlow | |
| 4,138,512 A | 2/1979 | Glaski | |
| 4,577,431 A * | 3/1986 | Siemers et al. | 42/76.02 |
| 4,641,450 A | 2/1987 | Moll et al. | |
| 4,669,212 A * | 6/1987 | Jackson et al. | 42/76.02 |
| 4,685,236 A * | 8/1987 | May | 42/76.02 |
| 4,822,759 A * | 4/1989 | Newkirk et al. | 501/89 |
| 5,015,609 A * | 5/1991 | Newkirk et al. | 501/127 |
| 5,039,357 A | 8/1991 | Epler et al. | |
| 5,540,749 A * | 7/1996 | Li et al. | 75/340 |
| 5,600,912 A * | 2/1997 | Smith | 42/76.01 |
| 5,915,937 A * | 6/1999 | Christensen | 42/76.02 |
| 5,928,799 A * | 7/1999 | Sherman et al. | 428/655 |
| 5,935,351 A | 8/1999 | Sherman et al. | |
| 6,305,293 B1 * | 10/2001 | Fry et al. | 102/517 |
| 6,360,423 B1 * | 3/2002 | Groll | 29/527.2 |

(Continued)

FOREIGN PATENT DOCUMENTS

GB 2326222 8/1999

(Continued)

OTHER PUBLICATIONS

Remington 2005 Firearms Ammunition Accessories Catalog: Model 700 XCR (5 Pages).

(Continued)

*Primary Examiner* — Stephen M Johnson
(74) *Attorney, Agent, or Firm* — McGuireWoods, LLP; Charles J. Gross

(57) ABSTRACT

This invention encompasses articles, compositions, and methods that provide enhanced corrosion resistance and wear resistance to firearms, firearm components, and firearm accessories. In one aspect, for example, a substrate comprising a firearm component is coated with a first layer of a corrosion-resistant material such as a first metal, followed by a second thin film layer of an abrasion-resistant material such as a second metal, a ceramic material such as a metal nitride, diamond-like carbon material, or other materials.

29 Claims, 8 Drawing Sheets

U.S. PATENT DOCUMENTS

| | | |
|---|---|---|
| 6,497,772 B1 | 12/2002 | Meckel et al. |
| 6,511,710 B2 | 1/2003 | Warnecke |
| 6,576,598 B2 | 6/2003 | Brown |
| 6,782,650 B2 * | 8/2004 | McComas .................... 42/76.02 |
| 6,889,464 B2 * | 5/2005 | Degerness .................. 42/76.02 |
| 6,938,552 B2 * | 9/2005 | Tom et al. ..................... 102/517 |
| 2003/0078170 A1 | 4/2003 | Brown |
| 2004/0111947 A1 * | 6/2004 | McComas .................... 42/76.02 |
| 2005/0108916 A1 * | 5/2005 | Keeney et al. ............... 42/76.02 |
| 2005/0257413 A1 * | 11/2005 | Zimmermann ................ 42/75.1 |
| 2005/0268517 A1 * | 12/2005 | Withers et al. ............... 42/76.02 |

FOREIGN PATENT DOCUMENTS

| | | |
|---|---|---|
| WO | 2004/053182 | 6/2004 |

OTHER PUBLICATIONS

Extended European Search Report, issued for corresponding European Divisional Patent No. 10183840.7, issued by European Patent Office on Apr. 11, 2011.

\* cited by examiner

Start

0 Hours

Control

Test Sample 1.5 Hours

Control

Test Sample 4.5 Hours

Control

Test Sample

Figure 3, Continued
8 Hours
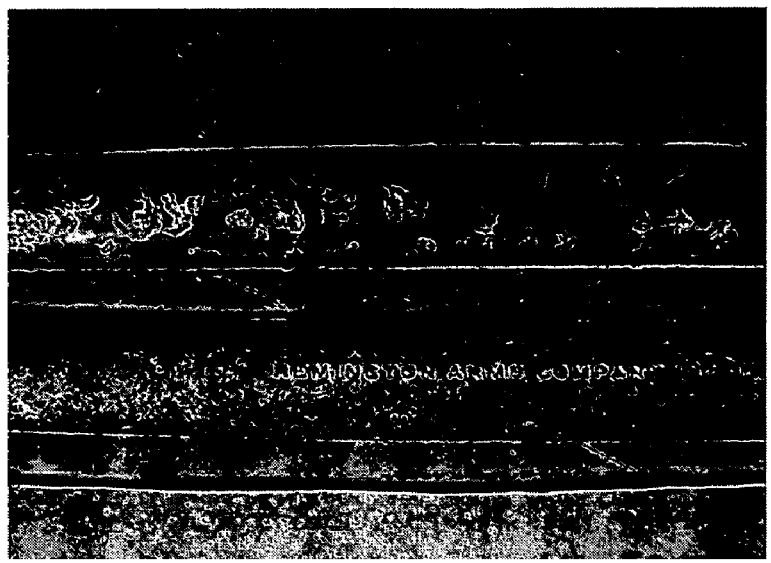
Control
Test Sample
Stop
23.5 Hours
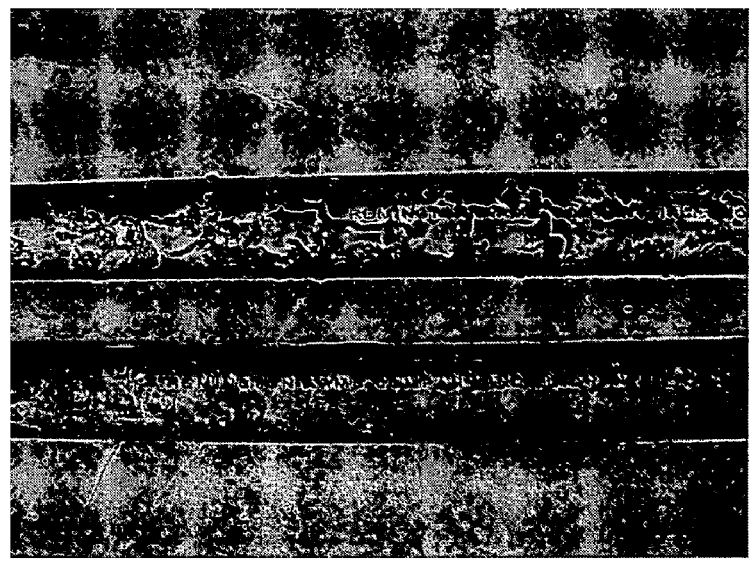
Control
Test Sample 7.5 hours Control Ni under ZrN ZrN only 23 hours Control Ni under ZrN ZrN only

START
0 HOURS 21.5 HOURS

46 HOURS

73.5 HOURS

FIREARM WITH ENHANCED CORROSION AND WEAR RESISTANCE PROPERTIES

RELATED APPLICATION DATA

This application claims the benefit of U.S. Provisional Patent Application Ser. No. 60/647,926, filed Jan. 27, 2005, which is incorporated herein by reference in its entirety.

FIELD OF THE INVENTION

This invention relates to compositions and methods that provide enhanced corrosion resistance and wear resistance properties to objects subjected to harsh environments, including firearms and firearm components.

BACKGROUND OF THE INVENTION

In the course of their routine use, firearms can be exposed to harsh environments in which they are subjected to corrosion, abrasion, or both. Such environments adversely affect both the external and the internal components of a firearm, resulting in rusting, pitting, scratching, marring, excessive wear, and the like, and potentially leading to decreased product life, unreliability, and even hazardous conditions.

While the interior of a firearm barrel is exposed to extremes of pressure, temperature, gas flow velocity, and wear when fired, many other firearm parts such as bolts, slides, receivers, firing mechanisms, and the like are also exposed to these extremes, which can accelerate rusting and pitting. Even the moisture and corrosive compounds that can contact a firearm from atmospheric conditions or simply from handling can result in pitting and ultimately decreased reliability.

Therefore, methods and compositions are needed that can provide enhanced performance properties to objects subjected to such harsh environments, including firearms and firearm parts made of steel or other materials. In particular, methods and compositions that provide enhanced corrosion resistance and wear resistance properties to such objects are desired.

SUMMARY OF THE INVENTION

The present invention encompasses methods and compositions that provide enhanced corrosion resistance and wear resistance properties to objects subjected to harsh environments, including firearms and firearm parts. The methods of this invention are applicable to any firearm, firearm part, or accessory, whether that part or accessory is made from steel, another metal or metal alloy, a composite material, or any number of other materials. Typically, the methods and compositions of this invention are typically applicable to any part of a rifle, shotgun, pistol, or accessory made of a metal or a metal alloy such as any type of steel. Various coatings and treatments that have been reported, for example, those provided in U.S. Patent or Patent Publication Numbers 1,886,218; 2,799,959; 3,112,553; 3,503,787; 3,523,035; 4,138,512; 4,641,450; 5,039,357; 6,511,710 B2; 2003/0078170 A1; 6,576,598 B2; each of which is incorporated herein by reference in its entirety.

In one aspect, this invention is related to firearms, firearm components, and firearm accessories with enhanced corrosion and wear properties, made possible by coating the firearm, component, or accessory with a combination of corrosive-resistant metal plating, followed by a thin film coating of another material such as another metal; a ceramic material such as a metal nitride, a metal carbonitride, a metal carbide, or a metal sulfide; materials such as graphite or diamond-like carbon (DLC); or any combination of any of these materials. Specifically, this invention provides a firearm, firearm components, or firearm accessories comprising: 1) a substrate; 2) a first layer covering at least a portion of the substrate, comprising at least one corrosion-resistant first metal or first metal alloy; and 3) a second layer covering at least a portion of the first layer, comprising at least one constituent selected from a second metal, a second metal alloy, a metal nitride, a metal carbonitride, a metal carbide, a metal sulfide, graphite, diamond-like carbon (DLC), or any combination thereof.

In another aspect, for example, this invention encompasses a stainless steel, carbon steel, or alloy steel firearm component or accessory, over which is coated a first layer comprising nickel, such as an electroless nickel (ENi) layer, and over which is coated a second layer comprising a thin-film of zirconium nitride. While not intending to be bound by theory, it is believed that the ENi coating enhances the corrosion resistance of the component, while the metal nitride coating provides a thin, hard, wear-resistant coating, while also providing some corrosion resistance. Even in cases where the firearm component comprises materials that are not subject to corrosion, such as various composite materials, these layers can provide hard, wear-resistant coatings and enhance the decorative and cosmetic features of the component.

The coatings of this invention can be applied to any firearm component such as frames, chambers, barrels, bushings, slides, bolts, and the like, including any constituent or element thereof such as, for example, springs, screws, and levers. Further, the coatings of this invention can be applied to any firearm accessory such as, for example, trigger locks, scopes, tactical lights, aiming devices, bipods, and the like, including any constituent or element thereof such as, for example, springs, screws, and levers.

While the coatings of this invention can be applied to metallic or non-metallic substrates, in one aspect, they are typically applied to a metal or metal alloy such as any type of steel. In one aspect, examples of the corrosive-resistant metals that are useful in preparing the first layer include, but are not limited to, nickel, chromium, an alloy of nickel, an alloy of chromium, and the like, or a combination thereof. Examples of the thin film coatings that are useful in preparing the second layer include, but are not limited to, metals, non-metals, alloys, ceramic materials, non-ceramic materials, amorphous materials, crystalline materials, or any combination of these materials. In one aspect, for example, useful materials for preparing the thin film second layer include, but are not limited to, metals, metal alloys, metal nitrides, metal carbonitrides, metal carbides metal sulfides, graphite, and diamond-like carbon. In another aspect, for example, useful materials for preparing the thin film second layer include, but are not limited to, zirconium nitride, boron nitride, titanium nitride, titanium aluminum nitride, titanium carbonitride, chromium nitride, chromium carbonitride, tungsten nitride, tungsten carbide, tungsten/tungsten carbide, boron carbide, aluminum chromium nitride, chromium carbide, molybdenum disulfide, molybdenum, nickel, rhenium, tungsten, chromium, graphite, diamond-like carbon (DLC), amorphous carbon, amorphous hydrogenated carbon, or any combination thereof.

In another aspect, the thin film coatings of the second layer, for example, the metal, metal alloy, metal nitride, metal carbonitride, metal carbide, metal sulfide, diamond-like carbon coating, graphite, and the like, can be collectively referred to as physical vapor deposition or "PVD" coatings, although typically, thin film coatings can be applied by any vapor-transport process, including chemical vapor deposition (CVD), physical vapor deposition (PVD), or a combination of both chemical and physical deposition methods. Thus, the second coating can be applied by a vapor transport process that relies on the coating material to be delivered to the base material in the vapor or gas phase, in which the deposition species can include atoms, molecules, small clusters, and the like, or any combination thereof.

In another aspect, this invention is related to firearms and firearm components with enhanced corrosion and wear properties, made possible by coating the component with a thin film coating such as a metal, metal alloy, metal nitride, metal carbonitride, metal carbide, or diamond-like coating material, without providing a first layer comprising a corrosive-resistant metal or metal alloy. For example, this aspect of the invention provides a firearm component such as a metal, composite, or polymer component, over which is coated a thin-film of a ceramic such as zirconium nitride, without an undercoating. The ceramic-only coating provides a thin, hard, wear-resistant coating which affords some corrosion resistance, and can also provide some decorative or cosmetic effects. In particular, this aspect of the present invention is applicable to long guns (rifles and shotguns) and long gun components.

DETAILED DESCRIPTION OF THE INVENTION

This invention encompasses methods and compositions that provide enhanced corrosion resistance and wear resistance to firearm components or accessories by coating a substrate comprising the component or accessory with a first layer of a corrosion-resistant metal, followed by a second layer of a thin film coating such as a metal nitride. In one aspect of this invention, the first layer of corrosion-resistant metal is an optional layer, thus coating a substrate with a layer of at least one ceramic material such as a metal nitride also enhances the corrosion resistance and wear resistance of the substrate.

Therefore, in one aspect, this invention provides a firearm component or accessory comprising:
  a. a substrate;
  b. a first layer covering at least a portion of the substrate, comprising at least one corrosion-resistant first metal or first metal alloy; and
  c. a second layer covering at least a portion of the first layer, comprising at least one constituent selected from a second metal, a second metal alloy, a metal nitride, a metal carbonitride, a metal carbide, a metal sulfide, graphite, diamond-like carbon (DLC), or any combination thereof.

Figure 1:
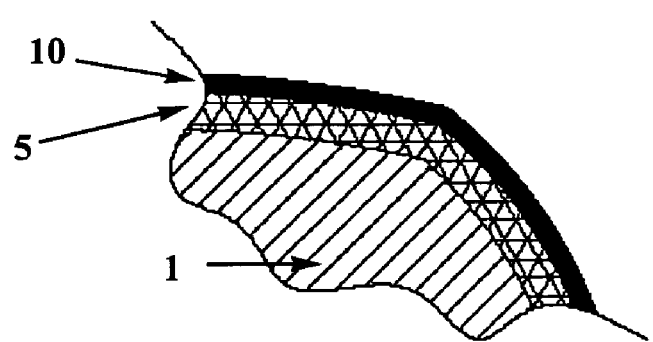
FIG. 1 illustrates a partial cross-sectional view of a firearm receiver in one aspect of this invention, demonstrating the relationship among a substrate material (1), a first layer of corrosion-resistant metal (5), and a thin film of a second layer of wear-resistant or decorative PVD or CVD coating (10).

An example of the firearm component or accessory of this invention includes, but is not limited to, a substrate comprising stainless steel, a first layer comprising nickel, and a second layer comprising zirconium nitride. FIG. 1 illustrates one aspect of the present invention by demonstrating a partial cross-sectional view of a firearm receiver according to this invention, and depicting the relationship among a substrate material (1), a first layer of corrosion-resistant metal (5), and a thin film of a second layer of wear-resistant or decorative PVD or CVD coating (10).

In a further aspect, the present invention provides a firearm component or accessory comprising:
  a. a substrate;
  b. an optional first layer covering at least a portion of the substrate, comprising at least one corrosion-resistant first metal or first metal alloy; and
  c. a second layer covering at least a portion of the substrate or optional first layer comprising at least one constituent selected from a second metal, a second metal alloy, a metal nitride, a metal carbonitride, a metal carbide, a metal sulfide, graphite, diamond-like carbon (DLC), or any combination thereof.

The coatings of this invention can be applied to any substrate for which protection is desired, such as enhanced corrosion and wear resistance, including any substrate that constitutes a firearm component or accessory, or to a firearm itself, including metallic or a non-metallic substrates. For example, the substrate can comprise a metal, a metal alloy, a composite material, a polymer, or any other material that can be used in the construction of firearms, including any combination of these materials. In one aspect, the substrate of this invention can comprise a metal or a metal alloy, examples of which include, but are not limited to, some type or grade of steel or other iron-containing material, an aluminum-containing alloy, and a scandium-containing alloy. In another aspect, for example, the substrate to which coatings are applied can comprise carbon steel, low-carbon steel, alloy steel, tin-free steel, killed steel, semikilled steel, capped steel, rimmed steel, aluminum killed steel, bake hardenable steel, stainless steel, austenitic stainless steel, ferritic stainless steel, martensitic stainless steel, or any combination thereof, or similar materials.

In still another aspect, the substrates to which coatings are applied can comprise any firearm component such as, for example, frames, slides, ramps, chambers, barrels, bushings, chokes, bolts, bolt sleeves, bolt locks, sears, lugs, receivers, dust covers, magazines, cylinders, hammers, trigger mechanisms, safety mechanisms, ejector mechanisms, extractors, guide rods, spring housings, rails, firing mechanisms, decocking devices, stocks, sights, sling swivels, suppressors, and the like, including any constituent or element thereof such as, for example, springs, screws, pins, and levers. In a further aspect of this invention, the coatings disclosed herein can be applied to substrates constituting any firearm accessory such as, for example, trigger locks, chamber locks, scopes, tactical lights, aiming devices, bipods, magazines, mounts, knives, bayonets, safes, or the like, including any constituent or element thereof such as, for example, springs, screws, pins, and levers. Moreover, the firearm component or accessory can be a component or accessory from any type of firearm, such as a shotgun or a rifle, collectively a "long gun," or a pistol. When the entire firearm comprises appropriate materials such as composite and metal alloy materials, the entire firearm can constitute a substrate. This invention also encompasses a firearm comprising a component, an accessory, or any portion thereof that comprises the coatings of the present invention.

One aspect of this invention is a first layer that covers at least a portion of the substrate, and comprising at least one corrosion-resistant metal first layer, and a second layer covering at least a portion of the first layer and comprising at least one thin film material. While any number of corrosion-resistant metals can be employed in this aspect, typically the first layer comprises nickel, chromium, an alloy of nickel, an alloy of chromium, or any combination thereof. In one aspect, the corrosive-resistant metal plating can be an electrolytic nickel plating, electroless nickel (ENi) plating (autocatalytic deposition of nickel from aqueous solutions), chrome plating, or any combination thereof, to enhance corrosion resistance. Typically, the corrosive-resistant coating comprises nickel, and in one aspect, the corrosive-resistant coating typically comprises electroless nickel (ENi). However, the present invention is not limited to nickel, chromium, or a combination thereof, and encompasses a first layer comprising any corrosion-resistant first metal. Therefore, the first layer can comprise at least one corrosion-resistant material that can be selected from a metal or a metal alloy, and in this aspect, any metal or metal alloy that imparts corrosion resistance to the substrate is encompassed by this invention.

A number of references provide detailed information regarding the deposition of a metal, such as corrosion-resistant metal layer of nickel or chromium, onto a substrate. In particular, information on electroless Ni (ENi) plating is disclosed in the treatise, "Electroless Ni Plating" by Wolfgang Riedel (Finishing Publications Ltd., c. 1991), which is incorporated herein by reference in its entirety. Also information on metal plating and vacuum and controlled-atmosphere coating surface modification processes can be found in "ASM Handbook, Vol. 5, 1994 Edition" (ASM International, c. 1994), also which is incorporated herein by reference in its entirety.

In one aspect of this invention, for example, this invention encompasses, but is not limited to, an electroless nickel (ENi) plating on a stainless steel or carbon steel part (substrate), over which is coated a thin-film of zirconium nitride. As further disclosed herein, any type of deposition or coating method can be used to deposit the corrosion-resistant metal or metal alloy layer, including but not limited to, solution methods such as electroplating or electroless plating, and vapor deposition methods such magnetron sputtering.

The second layer which covers at least a portion of the first layer, can be referred to herein as a thin film layer or coating. In one aspect, the terms thin film and thin film coatings are used in a generic fashion to describe the outside layer, which is typically the second layer. Thin film coatings include, but are not limited to, coatings comprising a metal, a metal alloy, a metal nitride, a metal carbonitride, a metal carbide, a metal sulfide, or a diamond like carbon coating or any combination thereof. In broad terms, examples of second layer materials (or thin film coatings) further include, but are not limited to, metals, non-metals, alloys, intermetallic compounds, ceramic materials, non-ceramic materials, amorphous materials, crystalline materials, or any combination of these materials. In one aspect, suitable materials can contain an amorphous portion and a crystalline, semi-crystalline, or microcrystalline portion, examples of which include diamond-like carbon (DLC). In general, the thin films of this disclosure provide strong, wear resistant coatings that offer corrosion protection and multiple cosmetic options. Thus, the second layer material can be selected to provide some measure of abrasion resistance to the underlying part, and can also provide corrosion resistance as well.

In one aspect, examples, of useful materials for preparing the thin film second layer include, but are not limited to, ceramic materials, metals, metal alloys, diamond-like carbon coatings, and other materials such as graphite. Thus, in another aspect, examples of useful materials for preparing the thin film second layer include, but are not limited to, metals, metal alloys, metal nitrides, metal carbonitrides, metal carbonides, metal sulfides, graphite, and diamond-like carbon. In still another aspect, for example, useful materials for preparing the thin film second layer include, but are not limited to zirconium nitride, boron nitride, titanium nitride, titanium aluminum nitride, titanium carbonitride, chromium nitride, chromium carbonitride, tungsten nitride, tungsten carbide, tungsten/tungsten carbide, boron carbide, aluminum chromium nitride, chromium carbide, molybdenum disulfide, molybdenum, nickel, copper, rhenium, tungsten, chromium, graphite, diamond-like carbon (DLC), amorphous carbon, amorphous hydrogenated carbon; and the like, including any combination thereof.

In one aspect, the thin film coatings of this invention are typically selected from ceramic materials and can comprise a metal nitride, a metal carbonitride, or a metal carbide coating. Examples of these materials include, but are not limited to, zirconium nitride, boron nitride, titanium nitride, titanium aluminum nitride, titanium carbonitride, chromium nitride, chromium carbonitride, tungsten nitride, tungsten carbide, tungsten/tungsten carbide, boron carbide, and the like, including combinations thereof. Thus, the terms metal nitride, a metal carbonitride, or a metal carbide are intended to include bimetallic ceramics such as titanium aluminum nitride. In addition, these ceramic coatings include such coatings as tungsten/tungsten carbide, which is typically applied to a first layer of corrosion-resistant metal. Regardless of how these materials may be applied to the substrate or to the first layer, they can be referred to collectively herein as physical vapor deposition or "PVD" coatings, although any vapor transport process including both chemical and physical deposition methods can be used to deposit these coatings, and methods other than vapor transport could be used to deposit some of these coatings. In one aspect, the thin film coatings can be applied using vapor transport methods, examples of which include, but are not limited to cathodic arc physical vapor deposition (CaPVD), enhanced arc physical vapor deposition (EaPVD), unbalanced magnetron sputtering, metal-organic chemical vapor deposition (MOCVD), plasma-assisted chemical vapor deposition (PaCVD), and the like, including any combination thereof. Further, these methods may be employed to apply any second layer thin film coating, and any first layer coating material disclosed herein, and are not limited to use with ceramic materials.

In another aspect, the second layer thin film coatings can comprise materials such as graphite, diamond-like carbon (DLC), crystalline carbon, amorphous carbon, amorphous hydrogenated carbon, or any combination thereof. Regardless of how these materials may be applied to the substrate or to the first layer, they are collectively referred to herein as physical vapor deposition or "PVD" coatings, although any vapor transport process including both chemical and physical deposition methods can be used to deposit these coatings, and methods other than vapor transport could be used to deposit some of these coatings.

In one aspect, the second layer thin film coatings can comprise a diamond-like carbon film, which can also be applied using vapor transport processes. Diamond-like carbon (DLC) films are hard, amorphous films that typically contain a substantial fraction of $sp^3$-hybridized carbon atoms, and which can contain a significant amount of hydrogen. Depending upon the conditions under which DLC films are deposited, these films can be fully amorphous or they can contain diamond crystallites. In one aspect, diamond-like films without hydrogen can be prepared by carbon ion beam deposition, by ion-assisted sputtering from graphite, or by the laser ablation of graphite. In another aspect, diamond-like carbon films containing a substantial content of hydrogen can be prepared by chemical vapor deposition methods, in which the hydrogen content can be over about 25 atomic %. As understood by one of ordinary skill, typical deposition parameters include the total pressure, the hydrogen partial pressure, the particular precursor molecules, and plasma ionization. In one aspect, the plasma activation can be radio frequency, microwave, or $Ar^+$ ions. In another aspect, high ionization typically favors amorphous films, while high atomic hydrogen contents typically favor diamond crystallite formation. As used herein, the term diamond-like carbon films is used synonymously with terms such as hard amorphous carbon films, and other terms that have been suggested because of the confusion about structure engendered by the term diamond-like carbon. (See: IUPAC Compendium of Chemical Terminology, 2nd Edition (1997).)

In still another aspect, the second layer thin film coatings can comprise materials such as metals, metal alloys, or combinations thereof. For example, second layer thin film coatings can comprise molybdenum, nickel, rhenium, tungsten, chromium, titanium, any alloy thereof, or any combination thereof. These materials can also coated using vapor transport methods, however any method known to one of ordinary skill can be employed to form the second layer thin film coatings comprising metals, metal alloys, or combinations thereof, such as solution methods, if applicable to depositing the desired coating, can be used in this aspect.

In one aspect, when the first layer is a first metal and the second is a second metal, the first metal can be the same as, or different from, the second metal. Similarly, in another aspect, when the first layer is a first metal alloy and the second is a second metal alloy, the first metal alloy can be the same as, or different from, the second metal alloy. In yet another aspect, when the first layer is a first metal and the second is a second metal, typically the first metal is different from the second metal, and in still another aspect, when the first layer is a first metal alloy and the second is a second metal alloy, typically the first metal alloy is different from the second metal alloy.

Still another aspect of this invention provides that when the first layer is a first metal and the second is a second metal, the first metal can be the same as the second metal when the method of depositing the first metal is different from the method of depositing the second metal, or when the deposition parameters and conditions for depositing the first metal are different from the deposition parameters and conditions for depositing the second metal. While not intending to be bound by theory, it is believed that depositing the first and the second metals using different methods or conditions provides physical and chemical differences between the layers that provide a discontinuity between the layers, likely arising from differences in density, crystallinity, phase structure, solid state packing, incorporation of minor or trace constituents, and the like. In one aspect, for example, a first layer of nickel could be deposited using aqueous deposition methods such as an electrochemical process, and a second layer of nickel could be deposited using a PVD process.

Numerous references, treatises, and trade literature provide detailed information regarding the deposition of a thin film coating such as metals, alloys, intermetallic compounds, metal nitrides, metal carbonitrides, metal carbides, diamond-like carbon, and other coatings, onto a substrate. In one aspect, a typical PVD process uses a vacuum arc to evaporate the material of interest from a cathode, which produces a stream of highly activated coating material. Typically, parts to be coated are first heated using radiant heaters or an ion bombardment process to remove adsorbed contaminants from the surface. The parts can then be conditioned by running the evaporation sources for a short time under a high voltage (for example, 1000 V), to enhance adhesion of the coating to the part. Then, the evaporation sources are run, typically at a somewhat reduced voltage (For example, around 200 V) while the necessary gases are admitted to produce the compound of interest. For example, admitting nitrogen while zirconium is being evaporated under the appropriate conditions, will provide a zirconium nitride coating.

In one aspect of this invention, thin film coatings such as a metals, alloys, nitrides, carbonitrides, carbides, diamond-like carbon, and the like, are deposited onto a substrate to provide, among other things, enhanced mar- and wear-resistance properties to the substrate. In a further aspect of this invention, the ceramic coatings such as metals, alloys, nitrides, carbonitrides, carbides, diamond-like carbon, and the like, can also provide cosmetic or decorative coatings to a firearm component or accessory. Therefore, this invention encompasses methods of preparing cosmetic or decorative finishes to firearm components or accessories, as well as such components or accessories that are finished according to this method.

In a further aspect, for example, this invention encompasses a stainless steel or carbon steel substrate, over which is deposited ENi plating, and over which is then deposited a thin film of zirconium nitride.

In another aspect of this invention, when the substrate is a firearm barrel, the bore of the firearm barrel can be "masked" during the application of the inventive coating such that none of the coating is applied to the interior of the barrel. However, this is not a requirement of the present invention.

Accordingly, in another aspect, this invention provides a firearm component or accessory comprising:
    a. a substrate comprising carbon steel, low-carbon steel, alloy steel, tin-free steel, killed steel, semikilled steel, capped steel, rimmed steel, aluminum killed steel, bake hardenable steel, stainless steel, austenitic stainless steel, ferritic stainless steel, martensitic stainless steel, or any combination thereof;
    b. a first layer covering at least a portion of the substrate, comprising nickel, chromium, an alloy of nickel, an alloy of chromium, or any combination thereof; and c. a second layer covering at least a portion of the first layer, comprising zirconium nitride, boron nitride, titanium nitride, titanium aluminum nitride, titanium carbonitride, chromium nitride, chromium carbonitride, tungsten nitride, tungsten carbide, tungsten/tungsten carbide, boron carbide, aluminum chromium nitride, chromium carbide, molybdenum disulfide, molybdenum, nickel, rhenium, tungsten, chromium, graphite, diamond-like carbon (DLC), amorphous carbon, amorphous hydrogenated carbon, or any combination thereof.

Any method known to one of ordinary skill that is applicable to the particular material being applied can be used to deposit both the first layer of corrosion-resistant material and the second layer of thin film material. For example, both solution methods such as electroplating, and vapor deposition methods such magnetron sputtering can be used in the present invention, if the particular method is applicable to the layer of the specific material being deposited. Thus, wet (solution) methods, dry (non-solution) methods, high vacuum methods, ambient pressure methods, acid-base methods, redox methods, metathesis methods, high temperature methods, low temperature methods, ambient temperature methods, and the like, if applicable to depositing the desired coating, can be used in this invention.

In one aspect, methods for depositing corrosion-resistant first layers such as chromium, nickel, or alloys thereof, include, but are not limited to, electroplating or electrodeposition methods, electroless deposition methods, physical vapor deposition (PVD) methods, chemical vapor deposition (CVD) methods, thermal spray coating methods, electric arc coating methods, plasma coating methods, or any combination thereof. In this aspect, the corrosion-resistant first layer materials can typically be applied to the substrate at a thickness of from about 0.00001 inches to about 0.0005 inches in thickness. In another aspect, the thickness of the corrosion-resistant metal can be from about 0.00003 inches to about 0.0003, or from about from about 0.00005 inches to about 0.00015 inches in thickness. In another aspect, the first layer comprising at least one corrosion-resistant metal can typically be applied to the substrate at a thickness of about 0.00010 inches.

In another aspect, methods for depositing thin film second layer materials such as metals, metal alloys, ceramic materials, diamond-like carbon, and the like, include, but are not limited to, vapor transport processes such as PVD methods, CVD methods, or any combination thereof. In this aspect, for example, the thin film second layer materials can be applied using cathodic arc physical vapor deposition (CaPVD), enhanced arc physical vapor deposition (EaPVD), unbalanced magnetron sputtering, metal-organic chemical vapor deposition (MOCVD), plasma-assisted chemical vapor deposition (PaCVD), and the like, including any combination of these methods. In this aspect, the thin film second layer materials can typically be applied over the first layer or directly over the substrate in the absence of a first layer material at a thickness of from about 0.00002 inches to about 0.00016 inches. In another aspect, the thin film second layer materials can typically be applied over the first layer or directly over the substrate at a thickness of from about 0.1 μm (0.000079 inches) to about 5 μm (0.00011 inches). In other aspects, the thin film second layer material can be from about 0.3 μm to about 4 μm, or from about 0.5 to about 3 μm, or from about 2 μm to about 3 μm in thickness. When the layer of thin film material is applied directly to the substrate in the absence of the optional corrosion-resistant metal layer, the thin film material can typically be applied at a thickness that is about the same as that employed when the thin film material is applied as a second layer over a first layer of corrosion-resistant metal.

Rifle barrels produced according to the present invention were tested to evaluate changes in corrosion resistance. For this purpose, a salt spray apparatus as disclosed in ASTM B 117-97 or ASTM B 117-03 was employed. Each of these ASTM standards is incorporated by reference in its entirety. The salt spray apparatus accelerates the corrosion and pitting procession by exposing a test product to extreme, highly corrosive conditions, thereby allowing a comparison of coatings over a reasonable time frame. The examples describe the typical test conditions used to compare uncoated and various coated materials of this invention. The results of this test, also provided as examples, demonstrate the improvements in corrosion resistance that are provided by coatings of the present invention.

Accordingly, this invention also encompasses a method of protecting a firearm component or accessory, and also provides a method of making a firearm component or accessory comprising:
 a. providing a substrate;
 b. coating at least a portion of the substrate with a first layer comprising at least one corrosion-resistant first metal or first metal alloy; and
 c. coating at least a portion of the first layer with a second layer comprising at least one constituent selected from a second metal, a second metal alloy, a metal nitride, a metal carbonitride, a metal carbide, a metal sulfide, graphite, diamond-like carbon (DLC), or any combination thereof.

In this aspect of the invention, the substrate, the first layer materials, and the second layer materials as provided herein, are selected independently, thus, any combination of substrate, first layer, and second layer materials are encompassed by this invention.

Although methods and materials similar to or equivalent to those described herein can be used in the practice or testing of this invention, typical methods, syntheses, and materials are described herein. All references such as publications and patents that are disclosed are incorporated herein by reference in their entireties, unless otherwise specified, for the purpose of describing and disclosing, for example, the constructs and methodologies that are described in these references, which might be used in connection with the presently described invention. The references provided or discussed in the text are provided solely for their disclosure prior to the filing date of the present application. Nothing herein is to be construed as an admission that the inventors are not entitled to antedate such disclosure by virtue of prior invention.

To the extent that any definition or usage provided by any document incorporated herein by reference conflicts with the definition or usage provided herein, the definition or usage provided herein controls.

When Applicant discloses or claims a range of any type, for example a range of thicknesses, a range of atom ratios, a range of molar ratios, or the like, Applicant's intent is to disclose or claim individually each possible number that such a range could reasonably encompass, as well as any sub-ranges and combinations of sub-ranges encompassed therein, consistent with the disclosure herein. For example, the disclose of a layer thickness of from about 0.5 μm to about 3 μm thick, as used herein, refers to a thickness of about 0.5 μm, about 0.6 μm, about 0.7 μm, about 0.8 μm, about 0.9 μm, about 1.0 μm, about 1.1 μm, about 1.2 μm, about 1.3 μm, about 1.4 μm, about 1.5 μm, about 1.6 μm, about 1.7 μm, about 1.8 μm, about 1.9 μm, about 2.0 μm, about 2.1 μm, about 2.2 μm, about 2.3 µm, about 2.4 µm, about 2.5 µm, about 2.6 µm, about 2.7 µm, about 2.8 µm, about 2.9 µm, or about 3,0 µm, as well as any range between any of these values, for example from about 0.8 µm to about 1.5 µm in thickness, and also including any combination of ranges between these two numbers, for example from about 0.6 µm to about 1.0 µm and from about 2.0 µm to about 2.5 µm in thickness. Applicant reserves the right to proviso out or exclude any individual members of any such group, including any sub-ranges or combinations of sub-ranges within the group, that may be claimed according to a range or in any similar manner, if for any reason Applicant chooses to claim less than the full measure of the disclosure, for example, to account for a reference that Applicants may be unaware of at the time of the filing of the application. Further, any combination or independent selection of substrate, first layer, and second layer are encompassed by this invention. However, Applicant also reserves the right to proviso out or exclude any individual substrates, first layer components, and second layer components, if for any reason Applicant chooses to claim less than the full measure of the disclosure, for example, to account for a reference that Applicant may be unaware of at the time of the filing of the application.

The present invention is further illustrated by the following examples, which are not to be construed in any way as imposing limitations upon the scope thereof. On the contrary, it is to be understood that resort may be had to various other aspects, embodiments, modifications, and equivalents thereof which, after reading the description herein, may suggest themselves to one of ordinary skill in the art without departing from the spirit of the present invention or the scope of the appended claims.

EXAMPLE 1

Comparative Corrosion Data from Rifle Barrels

Rifle barrels prepared according to this invention were tested in a salt spray apparatus to examine accelerated corrosion, and compared to various other rifle barrels that did not incorporate a combination of coatings according to this disclosure. Testing was performed both at Remington and by IMR Test Labs, Lansing N.Y., according to the testing protocol disclosed in ASTM B 117-97 or ASTM B 117-03. The inventive barrel that was tested comprised a stainless steel Remington M/700 rifle barrel, coated with a first layer of electroless Ni (ENi) plating, followed by a second layer of ZrN (zirconium nitride) PVD coating. The Remington M/700 rifle barrel coated in this manner was designated Remington M/700XCR. Coating specifications are as follows. The ENi coating was applied to a thickness of from about 0.00005 inches to about 0.00015 inches, using high phosphorous nickel plate. The ZrN (zirconium nitride) coating was applied to a thickness of about 2 µm to about 3 µm (about 0.000079 inches to about 0.00011 inches) using standard PVD coating techniques.

Tables 1 and 2 compare the inventive rifle barrels with various commercially available rifle barrels, where percent (%) corrosion is tabulated. Each of these 8 samples were subjected to 72 hours of continuous salt spray according to ASTM B 117-03. The different barrels examined are show in the table below.

TABLE 1

Sample rifle barrels tested. Inventive barrels number 1 and 2 are stainless steel Remington M/700 rifle barrels, coated with a first layer of electroless Ni(ENi), followed by a second layer of ZrN.

| Barrel No. | Type | Material Description |
|---|---|---|
| 1 | Inventive | Inventive |
| 2 | Inventive | Inventive |
| 3 | Comparative | Stainless Steel |
| 4 | Comparative | Stainless Steel |
| 5 | Comparative | All Weather |
| 6 | Comparative | All Weather |
| 7 | Comparative | Stainless Steel |
| 8 | Comparative | Stainless Steel |

TABLE 2

Comparative corrosion data using the barrels employed in Table 1.

Percent Red Rust Corrosion and Number of Individual Rust Spots
(RR = Red Rust; IRS = Individual Rust Spot)

| Time (hours) | Barrel 1 Inventive | Barrel 2 Inventive | Barrel 3 Comparative | Barrel 4 Comparative | Barrel 5 Comparative | Barrel 6 Comparative | Barrel 7 Comparative | Barrel 8 Comparative |
|---|---|---|---|---|---|---|---|---|
| 4 | 0 RR | 0 RR | 5 RR | 10 RR | <1 RR | 10 RR | 5 RR | 5 RR |
| 8 | 0 RR | 0 RR | 5 RR | 15 RR | <1 RR | 20 RR | 10 RR | 10 RR |
| 24 | 0 RR | 1 IRS | 10 RR | 20 RR | <1 RR | 35 RR | 15 RR | 20 RR |
| 28 | 1 IRS | 3 IRS | 10 RR | 20 RR | <1 RR | 40 RR | 15 RR | 20 RR |
| 32 | 1 IRS | 3 IRS | 15 RR | 20 RR | <1 RR | 45 RR | 15 RR | 20 RR |
| 48 | 2 IRS | 7 IRS | 20 RR | 20 RR | <1 RR | 45 RR | 20 RR | 25 RR |
| 52 | 5 IRS | >10 Pits | 25 RR | 25 RR | <1 RR | 50 RR | 20 RR | 25 RR |
| 56 | 5 IRS | >10 Pits | 25 RR | 25 RR | <1 RR | 50 RR | 20 RR | 25 RR |
| 72 | 5 IRS | >10 Pits | 25 RR | 25 RR | <1 RR | 50 RR | 20 RR | 25 RR |

Figure 2:
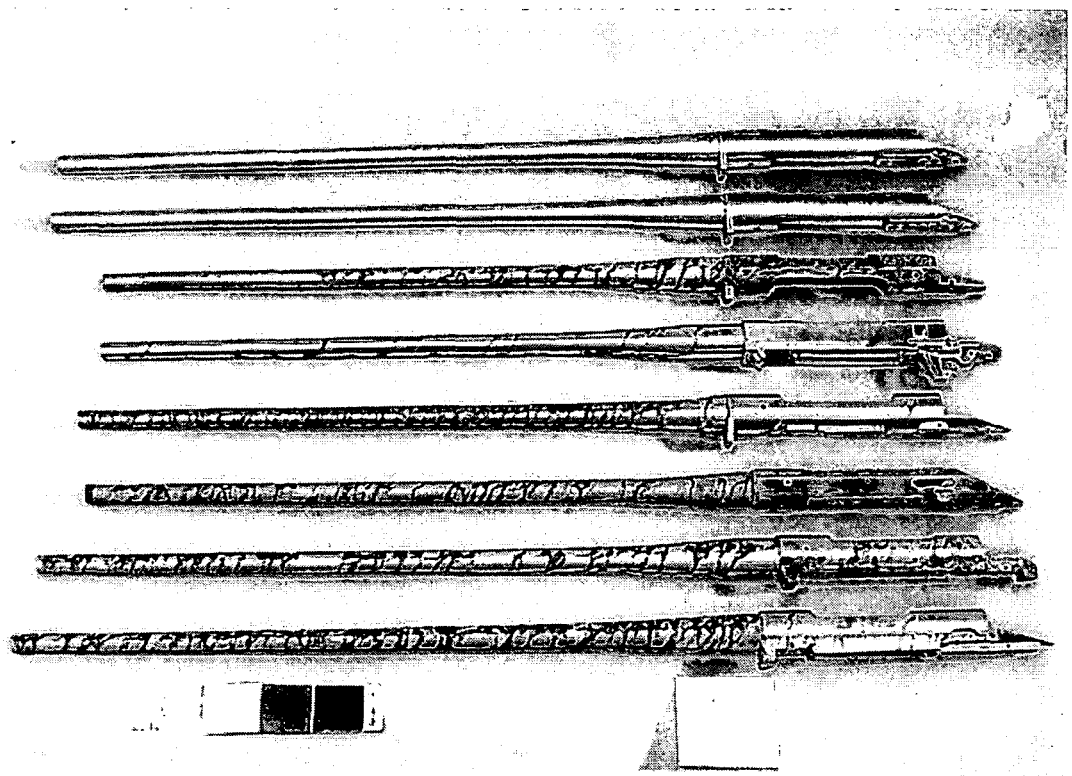
FIG. 2 illustrates the corrosion test comparison of inventive and control rifle barrels. The two inventive barrels appear at the top of FIG. 2, while the six control samples are below the top two inventive barrels. This Figure illustrates the corrosion after 48 hours in a salt spray apparatus.

FIG. 2 illustrates the corrosion test comparison of inventive and control rifle barrels shown in Tables 1 and 2, demonstrating the level of corrosion after 48 hours in the salt spray apparatus. The two inventive barrels (Barrels 1 and 2 of Table 2) appear at the top of FIG. 2, while the six control samples (Barrels 3-8 of Table 2) are below the top two inventive barrels, though their position in the Figure does not necessarily correspond to the Barrel number of Table 2. As illustrated in FIG. 2, the inventive barrels appear almost completely uncorroded, with only miniscule individual rust spots barely visible. All the comparative barrels, even Barrel 5 (the fourth from the top of FIG. 2) show substantial to extreme corrosion under these same conditions.

EXAMPLE 2

Corrosion Testing Using Rifle Barrels Coated with Ceramic Coating Only—Single Layer Rifle barrels were prepared according to this invention in which the stainless steel barrel was coated using a thin film "second layer" coating material only over the steel, and not employing a first layer coating of corrosion resistance metal. The inventive barrel was tested in a salt spray apparatus and compared to a standard uncoated rifle barrel. Corrosion testing was performed according to the protocol disclosed in ASTM B 117-97 or ASTM B 117-03, with the exception that there were no collectors in the chamber. However, each barrel tested was subjected to identical conditions. A standard stainless steel barrel was coated with zirconium nitride to a thickness of about 0.5 µm to about 1 µm and tested. Samples prepared in this manner performed better than uncoated control samples, but did not achieve the degree of corrosion resistance of the samples coated with both corrosion resistance metal and ceramic (zirconium nitride) material, which was also examined.

Figure 3:
FIG. 3 illustrates the corrosion test comparison of a control sample, a standard Remington M/700 stainless steel barrel (Top in each figure), as compared to a Remington M/700 stainless steel barrel coated to 1 µm with zirconium nitride (PVD) without an undercoat of nickel (Bottom in each figure).
Figure 3:
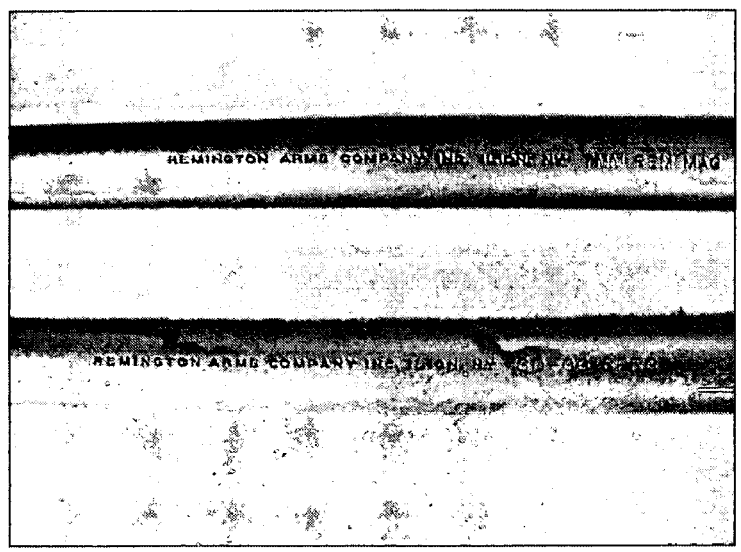
Figure 3:
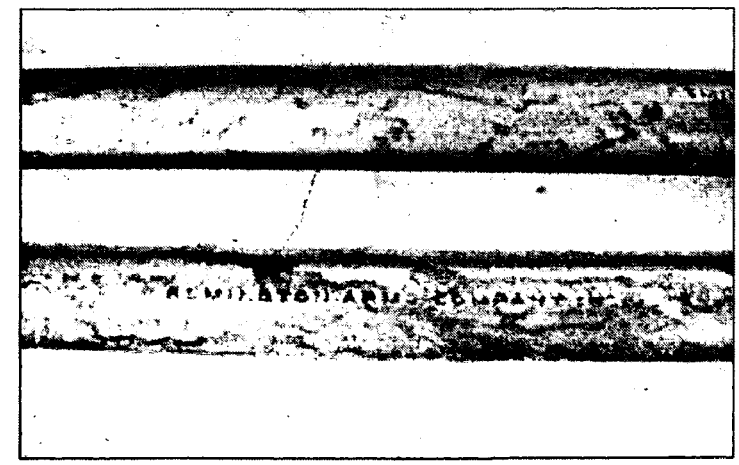

FIG. 3 illustrates the corrosion test comparison of a control sample, a standard Remington M/700 stainless steel barrel was used as the control or comparative barrel (Top in each figure), as compared to an inventive Remington M/700 stainless steel barrel coated to 1 µm with zirconium nitride (PVD), but without an undercoat of nickel (Bottom in each figure). A photographic comparison was made after 0, 1.5, 4.5, 8, and 23.5 hours elapsed test time. As shown in FIG. 3, the control barrel corroded at a somewhat more rapid rate than the inventive barrel, exhibiting more white corrosion, more red rust, and more individual rust spots than the inventive barrel. However, the difference between corrosion rates did not appear large.

Figure 4:
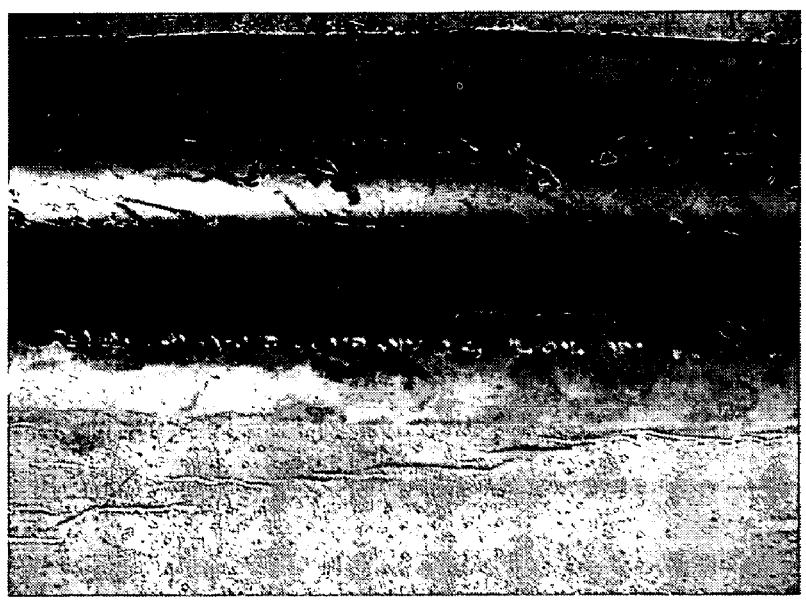
FIG. 4 illustrates the corrosion test comparison of a control sample, a standard Remington M/700 stainless steel barrel (Top in each figure), as compared to a Remington M/700 stainless steel barrel coated to 3 µm with zirconium nitride (PVD) without an undercoat of nickel (Bottom in each figure).

In contrast, FIG. 4 illustrates the corrosion test comparison of a control or comparative sample, a standard Remington M/700 stainless steel barrel like that used to obtain the FIG. 3 results (Top in each figure), as compared to an inventive Remington M/700 stainless steel barrel coated to 3 µm with zirconium nitride (PVD), thicker that the barrels shown in FIG. 3, but also without an undercoat of nickel (Bottom in each figure). A photographic comparison was made after 17 hours elapsed test time. As shown in FIG. 4, the control barrel again corroded at a somewhat more rapid rate than the inventive barrel, exhibiting more white corrosion, red rust, and individual rust spots than the inventive barrel. However, the difference between corrosion rates did not appear large, but that difference did appear to be greater than that observed with the Remington M/700 stainless steel barrel coated to only 1 µum with zirconium nitride (PVD), shown in FIG. 3.

EXAMPLE 3

Corrosion Testing Using Rifle Barrels Coated with Ceramic Coating Only—Two Layers Rifle barrels were prepared according to this invention in which the stainless steel barrel was coated using two ceramic coating layers over the steel, and not employing a first coating of corrosion resistance metal. In this example, two tests were conducted. First, two ceramic coatings layers of zirconium nitride (PVD) were employed. Second, a layer of chromium nitride (PVD) under a layer of zirconium nitride (PVD) was employed. In both instances, samples performed better than uncoated control samples, but did not achieve the degree of corrosion resistance of the samples coated with both corrosion resistance metal and ceramic (zirconium nitride) material.

EXAMPLE 4

Comparative Corrosion Data for Uncoated, ENi/ZrN-Coated, and ZrN-Only Coated Rifle Barrels Rifle barrels prepared according to this invention were tested in a salt spray apparatus according to ASTM B 117-97 or ASTM B 117-03, with the exception that there were no collectors in the chamber. However, each barrel tested was subjected to identical conditions. This example compares uncoated, ENi/zirconium nitride-coated, and zirconium nitride-only coated barrels. The inventive standard stainless steel barrel was coated with electroless nickel (ENi) followed by zirconium nitride, and tested to 23.5 hours, achieved a very high degree of corrosion resistance as compared to control samples. The zirconium nitride only coated barrel achieved some degree of corrosion resistance, but not as great as the ENi/zirconium nitride coated barrel.

Figure 5:
FIG. 5 illustrates the results of this test. Top: The top control barrel that was tested was a standard, uncoated stainless steel Remington M/700 rifle barrel. Middle: The middle test barrel was a stainless steel Remington M/700 rifle barrel coated with ENi and ZrN, using a first layer of from 0.00005 inch to about 0.00015 inches thickness of high phosphorus Electroless nickel (ENi) under a 2 µm PVD coating of zirconium nitride. Bottom: The bottom test barrel was a stainless steel Remington M/700 rifle barrel coated with a 2 µm PVD coating of zirconium nitride but no nickel.
Figure 5:

FIG. 5 illustrates the results of this test, with a photographic comparison was made after 7.5 and 23 hours elapsed test time. The barrels shown in FIG. 5 are as follows. Top: The top control or comparative barrel that was tested was a standard, uncoated stainless steel Remington M/700 stainless steel rifle barrel. Middle: The middle test barrel was a stainless steel Remington M/700 rifle barrel coated with ENi and ZrN, using a first layer of from 0.00005 inch to about 0.00015 inches thickness of high phosphorus Electroless nickel (ENi) under a 2 µm PVD coating of zirconium nitride. Bottom: The bottom test barrel was a stainless steel Remington M/700 rifle barrel coated with a 2 µm PVD coating of zirconium nitride, but without a nickel undercoating.

As shown in FIG. 5, the control or comparative barrel (top) corroded at a somewhat more rapid rate than the inventive barrel coated with a 2 µm PVD coating of zirconium nitride, but without a nickel undercoating (bottom), exhibiting more white corrosion, red rust, and individual rust spots than the inventive barrel. However, the control barrel corroded at a much more rapid rate than the inventive barrel coated with ENi and ZrN as detailed above (middle), and exhibited far more white corrosion, red rust, and individual rust spots than the inventive barrel under these conditions.

EXAMPLE 5

Additional Corrosion Data for ENi/ZrN-Coated Barrels Compared to Commercially-Available Barrels Rifle barrels prepared according to this invention were tested in a salt spray apparatus according to ASTM B 117-97 or ASTM B 117-03, with the exception that there were no collectors in the chamber. However, each barrel tested was subjected to identical conditions. This example compares ENi/zirconium nitride-coated barrels compared to commercially-available, non-Remington barrels. In each case, the ENi/zirconium nitride-coated barrels exhibited superior performance as compared to the commercially-available control barrels, showing only minimal signs of corrosion after 73.5 hours in the salt spray test chamber, as compared to the sever corrosion of the commercially-available control barrels.

Figure 6:
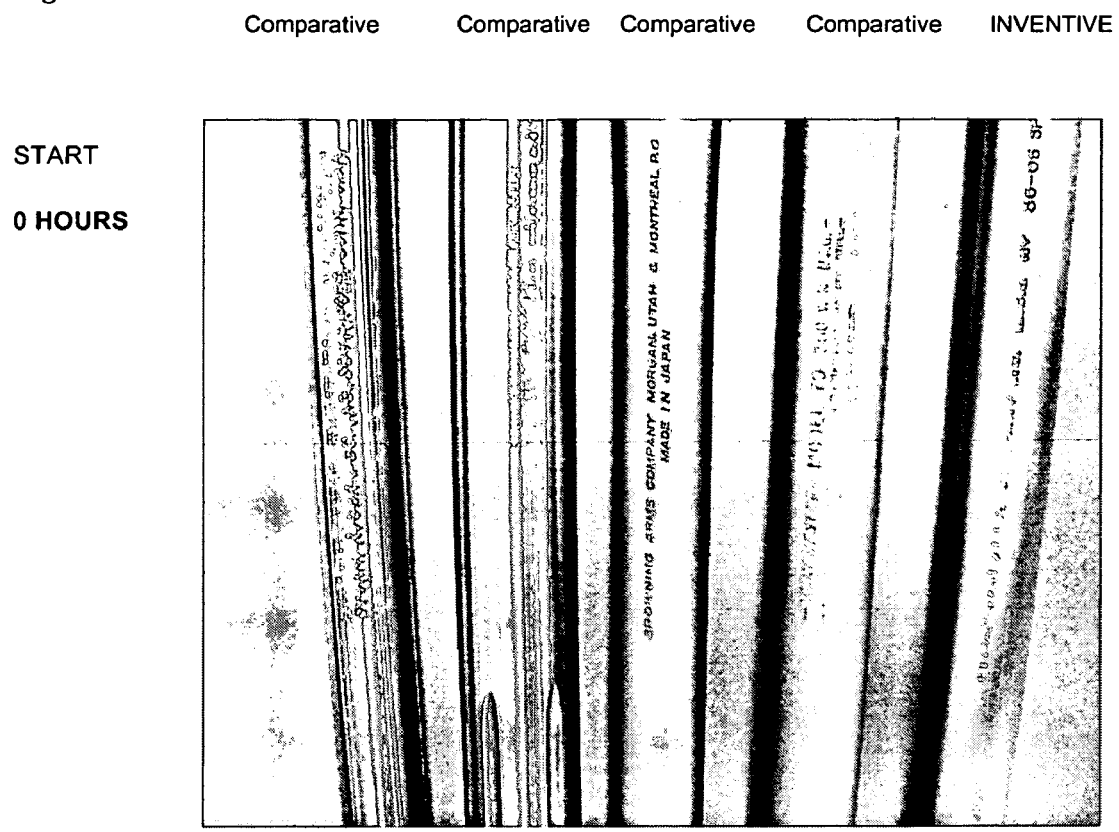
FIG. 6 illustrates a comparative test of a stainless steel Remington M/700 rifle barrel coated with ENi and ZrN, using a first layer of from 0.00005 inch to about 0.00015 inches thickness of high phosphorus Electroless nickel (ENi) under a 2 µm PVD coating of zirconium nitride. The other comparative test barrels are non-inventive, "out-of-the-box" barrels that were unaltered.
Figure 6:
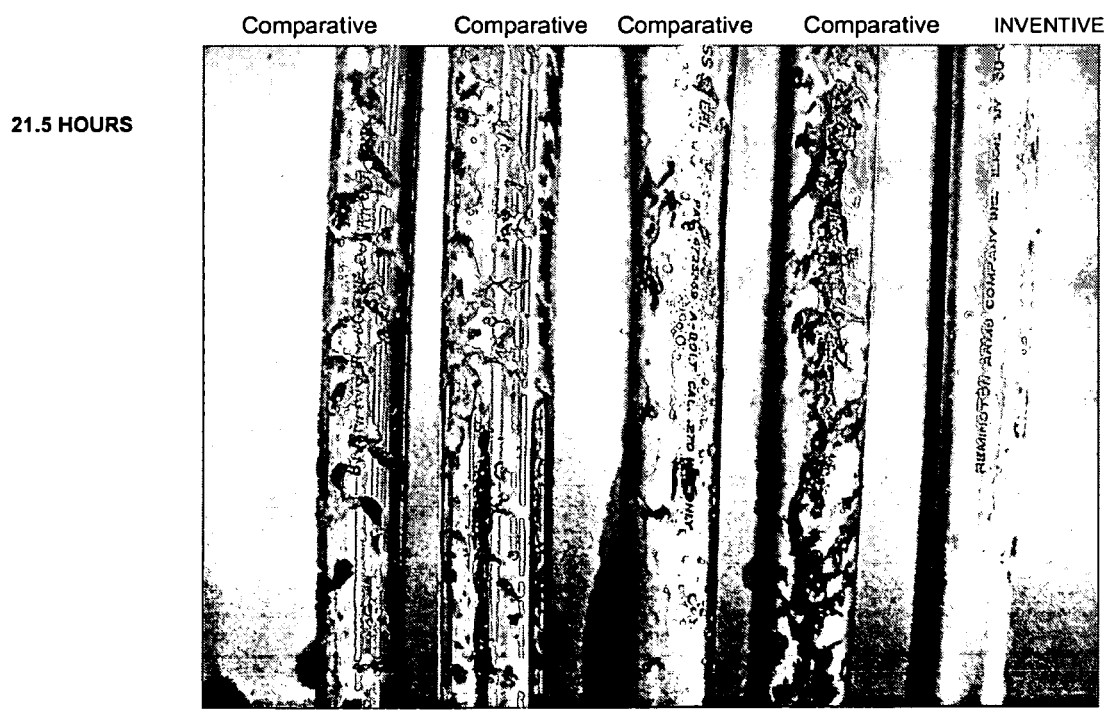
Figure 6:
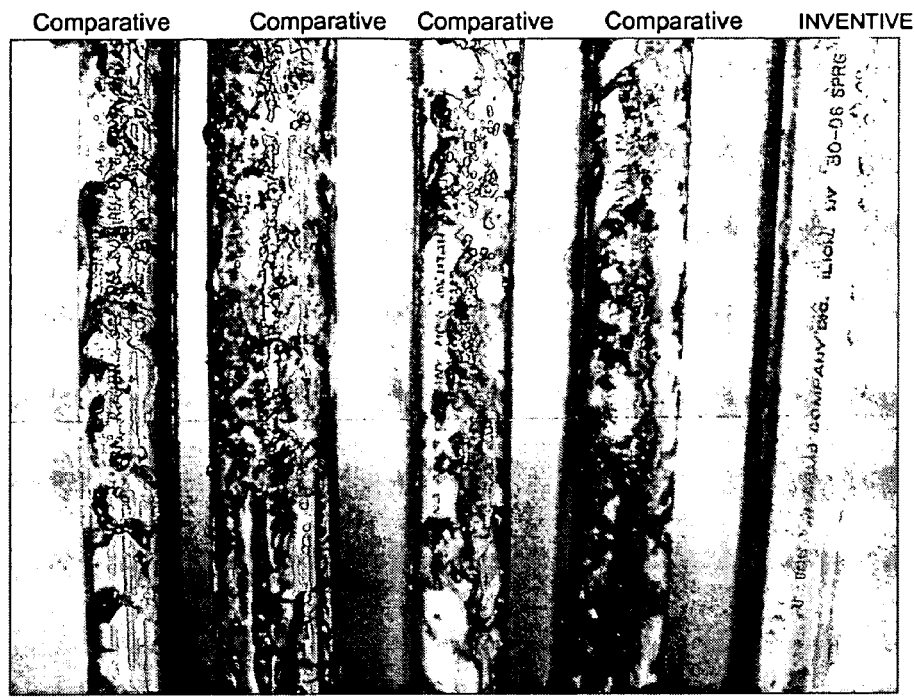
Figure 6:
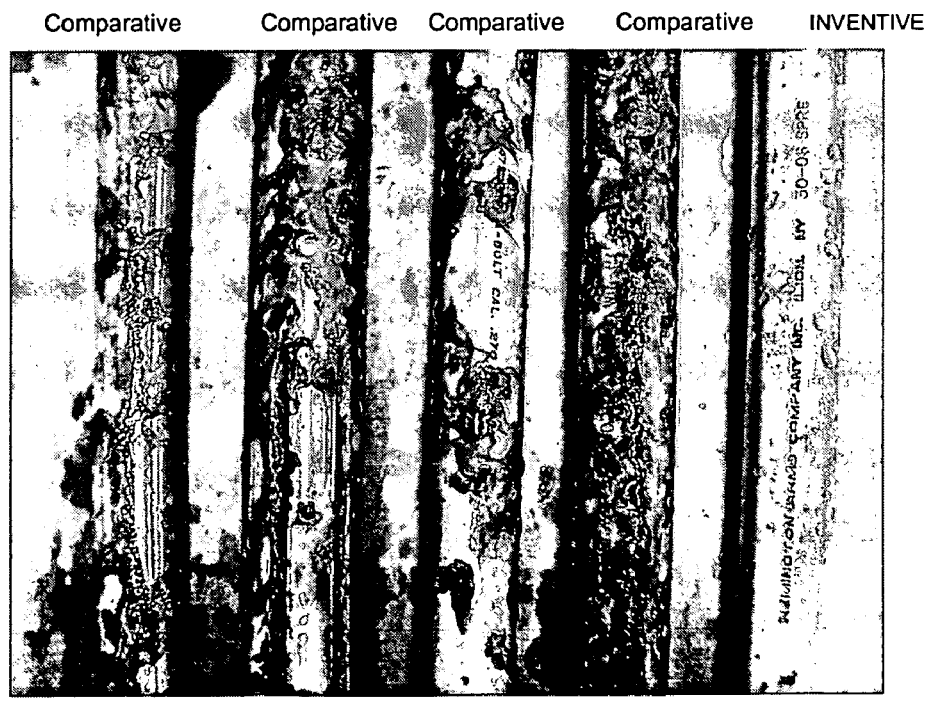

FIG. 6 illustrates a comparative test of an inventive test barrel sample (far right side of each photograph), which was a stainless steel Remington M/700 rifle barrel coated with ENi and ZrN, using a first layer of from 0.00005 inch to about 0.00015 inches thickness of high phosphorus Electroless nickel (ENi) under about a 2 µm PVD coating of zirconium nitride. All other comparative samples were "out-of-the-box" barrels from commercial sources and were not altered. A photographic comparison was made at 0, 21.5, 46, and 73.5 hours elapsed test time. As shown in FIG. 6, all of the control or comparative barrels corroded at a much more rapid rate than the inventive barrel, exhibiting more white corrosion, red rust, and individual rust spots than the inventive barrel.

EXAMPLE 6

Wear- and Mar-Resistance for ENi/ZrN-Coated Barrels Compared to Commercially-Available Barrels Rifle barrels prepared according to this invention were tested empirically for their wear- and mar-resistance. Specifically, wear resistance was empirically noted to be superior on the zirconium nitride PVD coated samples. Zirconium nitride-coated parts did not mar as easily as uncoated samples, a feature which is likely attributable to the hardness of the zirconium nitride PVD coating, which is greater than 2000 Vickers hardness. This hardness is over 6 times harder than the stainless steel base material which has a Vickers hardness of 260 (as converted from the Brinell Hardness Scale). Thus, it is believed that the high surface hardness of the thin coating creates a scratch resistant outer coating on the firearm.

EXAMPLE 7

Coatings Applied for Cosmetic Effect

Rifle barrels and other gun parts were also prepared according to this invention and examined for their cosmetic appearance. Examples of coatings examined for their cosmetic effect include the following.

- ZrN PVD (different colors obtainable using PVD)
- W/WC (tungsten/tungsten carbide) PVD
- Tungsten/DLC (tungsten/diamond-like carbon coating) PVD
- Electroless Ni (ENi)
- ENi co-deposited with Teflon™
- ENi co-deposited with Boron Nitride
- Various parts "painted" with a two part epoxy resin paint system Each of these coatings provide a different cosmetic appearance to the coated part. After reviewing the cosmetic properties of each sample, a desirable color sample of the ZrN PVD coating was established. One feature of the PVD process is the different cosmetic colors it can produce upon applying ceramic coatings such as ZrN or diamond-like carbon coatings.

EXAMPLE 8

Substrates and Coating Composition Combinations

In this example, Table 3 illustrates some additional combinations of substrate materials, first layer coating materials, and second layer materials that are encompassed by the present invention. These combinations are applicable to any firearm component or accessory as disclosed herein. Some of these examples are constructive.

TABLE 3

Examples of combinations of substrate materials, first layer coating materials, and second layer materials encompassed by this invention.

| Example No. | Substrate Material | Optional First Layer Material | Second Layer Material |
| --- | --- | --- | --- |
| 8.1-A | carbon steel | nickel | zirconium nitride |
| 8.2-A | carbon steel | nickel | boron nitride |
| 8.3-A | carbon steel | nickel | titanium nitride |
| 8.4-A | carbon steel | nickel | titanium aluminum nitride |
| 8.5-A | carbon steel | nickel | titanium carbonitride |
| 8.6-A | carbon steel | nickel | chromium nitride |
| 8.7-A | carbon steel | nickel | chromium carbonitride |
| 8.8-A | carbon steel | nickel | tungsten nitride |
| 8.9-A | carbon steel | nickel | tungsten carbide |
| 8.10-A | carbon steel | nickel | tungsten/tungsten carbide |
| 8.11-A | carbon steel | nickel | boron carbide |
| 8.12-A | carbon steel | nickel | aluminum chromium nitride |
| 8.13-A | carbon steel | nickel | chromium carbide |
| 8.14-A | carbon steel | nickel | molybdenum disulfide |
| 8.15-A | carbon steel | nickel | molybdenum |
| 8.16-A | carbon steel | nickel | nickel |
| 8.17-A | carbon steel | nickel | rhenium |
| 8.18-A | carbon steel | nickel | tungsten |
| 8.19-A | carbon steel | nickel | chromium |
| 8.20-A | carbon steel | nickel | graphite |
| 8.22-A | carbon steel | nickel | diamond-like carbon |
| 8.23-A | carbon steel | nickel | amorphous carbon |
| 8.24-A | carbon steel | nickel | amorphous hydrogenated carbon |
| 8.25-A | carbon steel | nickel | chromium nitride + zirconium nitride |
| 8.1-B | carbon steel | chromium | zirconium nitride |
| 8.2-B | carbon steel | chromium | boron nitride |
| 8.3-B | carbon steel | chromium | titanium nitride |
| 8.4-B | carbon steel | chromium | titanium aluminum nitride |
| 8.5-B | carbon steel | chromium | titanium carbonitride |
| 8.6-B | carbon steel | chromium | chromium nitride |
| 8.7-B | carbon steel | chromium | chromium carbonitride |
| 8.8-B | carbon steel | chromium | tungsten nitride |
| 8.9-B | carbon steel | chromium | tungsten carbide |
| 8.10-B | carbon steel | chromium | tungsten/tungsten carbide |
| 8.11-B | carbon steel | chromium | boron carbide |
| 8.12-B | carbon steel | chromium | aluminum chromium nitride |
| 8.13-B | carbon steel | chromium | chromium carbide |
| 8.14-B | carbon steel | chromium | molybdenum disulfide |
| 8.15-B | carbon steel | chromium | molybdenum |
| 8.16-B | carbon steel | chromium | nickel |
| 8.17-B | carbon steel | chromium | rhenium |
| 8.18-B | carbon steel | chromium | tungsten |
| 8.19-B | carbon steel | chromium | chromium |
| 8.20-B | carbon steel | chromium | graphite |
| 8.22-B | carbon steel | chromium | diamond-like carbon |
| 8.23-B | carbon steel | chromium | amorphous carbon |
| 8.24-B | carbon steel | chromium | amorphous hydrogenated carbon |
| 8.25-B | carbon steel | chromium | chromium nitride + zirconium nitride |
| 8.1-C | stainless steel[1] | nickel | zirconium nitride |
| 8.2-C | stainless steel[1] | nickel | boron nitride |
| 8.3-C | stainless steel[1] | nickel | titanium nitride |
| 8.4-C | stainless steel[1] | nickel | titanium aluminum nitride |
| 8.5-C | stainless steel[1] | nickel | titanium carbonitride |
| 8.6-C | stainless steel[1] | nickel | chromium nitride |
| 8.7-C | stainless steel[1] | nickel | chromium carbonitride |
| 8.8-C | stainless steel[1] | nickel | tungsten nitride |
| 8.9-C | stainless steel[1] | nickel | tungsten carbide |
| 8.10-C | stainless steel[1] | nickel | tungsten/tungsten carbide |
| 8.11-C | stainless steel[1] | nickel | boron carbide |
| 8.12-C | stainless steel[1] | nickel | aluminum chromium nitride |
| 8.13-C | stainless steel[1] | nickel | chromium carbide |
| 8.14-C | stainless steel[1] | nickel | molybdenum disulfide |
| 8.15-C | stainless steel[1] | nickel | molybdenum |
| 8.16-C | stainless steel[1] | nickel | nickel |
| 8.17-C | stainless steel[1] | nickel | rhenium |
| 8.18-C | stainless steel[1] | nickel | tungsten |
| 8.19-C | stainless steel[1] | nickel | chromium |
| 8.20-C | stainless steel[1] | nickel | graphite |
| 8.22-C | stainless steel[1] | nickel | diamond-like carbon |

TABLE 3-continued

Examples of combinations of substrate materials, first layer coating materials, and second layer materials encompassed by this invention.

| Example No. | Substrate Material | Optional First Layer Material | Second Layer Material |
|---|---|---|---|
| 8.23-C | stainless steel[1] | nickel | amorphous carbon |
| 8.24-C | stainless steel[1] | nickel | amorphous hydrogenated carbon |
| 8.25-C | stainless steel[1] | nickel | chromium nitride + zirconium nitride |
| 8.1-D | stainless steel[1] | chromium | zirconium nitride |
| 8.2-D | stainless steel[1] | chromium | boron nitride |
| 8.3-D | stainless steel[1] | chromium | titanium nitride |
| 8.4-D | stainless steel[1] | chromium | titanium aluminum nitride |
| 8.5-D | stainless steel[1] | chromium | titanium carbonitride |
| 8.6-D | stainless steel[1] | chromium | chromium nitride |
| 8.7-D | stainless steel[1] | chromium | chromium carbonitride |
| 8.8-D | stainless steel[1] | chromium | tungsten nitride |
| 8.9-D | stainless steel[1] | chromium | tungsten carbide |
| 8.10-D | stainless steel[1] | chromium | tungsten/tungsten carbide |
| 8.11-D | stainless steel[1] | chromium | boron carbide |
| 8.12-D | stainless steel[1] | chromium | aluminum chromium nitride |
| 8.13-D | stainless steel[1] | chromium | chromium carbide |
| 8.14-D | stainless steel[1] | chromium | molybdenum disulfide |
| 8.15-D | stainless steel[1] | chromium | molybdenum |
| 8.16-D | stainless steel[1] | chromium | nickel |
| 8.17-D | stainless steel[1] | chromium | rhenium |
| 8.18-D | stainless steel[1] | chromium | tungsten |
| 8.19-D | stainless steel[1] | chromium | chromium |
| 8.20-D | stainless steel[1] | chromium | graphite |
| 8.22-D | stainless steel[1] | chromium | diamond-like carbon |
| 8.23-D | stainless steel[1] | chromium | amorphous carbon |
| 8.24-D | stainless steel[1] | chromium | amorphous hydrogenated carbon |
| 8.25-D | stainless steel[1] | chromium | chromium nitride + zirconium nitride |
| 8.1-E | alloy steel[2] | nickel | zirconium nitride |
| 8.2-E | alloy steel[2] | nickel | boron nitride |
| 8.3-E | alloy steel[2] | nickel | titanium nitride |
| 8.4-E | alloy steel[2] | nickel | titanium aluminum nitride |
| 8.5-E | alloy steel[2] | nickel | titanium carbonitride |
| 8.6-E | alloy steel[2] | nickel | chromium nitride |
| 8.7-E | alloy steel[2] | nickel | chromium carbonitride |
| 8.8-E | alloy steel[2] | nickel | tungsten nitride |
| 8.9-E | alloy steel[2] | nickel | tungsten carbide |
| 8.10-E | alloy steel[2] | nickel | tungsten/tungsten carbide |
| 8.11-E | alloy steel[2] | nickel | boron carbide |
| 8.12-E | alloy steel[2] | nickel | aluminum chromium nitride |
| 8.13-E | alloy steel[2] | nickel | chromium carbide |
| 8.14-E | alloy steel[2] | nickel | molybdenum disulfide |
| 8.15-E | alloy steel[2] | nickel | molybdenum |
| 8.16-E | alloy steel[2] | nickel | nickel |
| 8.17-E | alloy steel[2] | nickel | rhenium |
| 8.18-E | alloy steel[2] | nickel | tungsten |
| 8.19-E | alloy steel[2] | nickel | chromium |
| 8.20-E | alloy steel[2] | nickel | graphite |
| 8.22-E | alloy steel[2] | nickel | diamond-like carbon |
| 8.23-E | alloy steel[2] | nickel | amorphous carbon |
| 8.24-E | alloy steel[2] | nickel | amorphous hydrogenated carbon |
| 8.25-E | alloy steel[2] | nickel | chromium nitride + zirconium nitride |
| 8.1-F | alloy steel[2] | chromium | zirconium nitride |
| 8.2-F | alloy steel[2] | chromium | boron nitride |
| 8.3-F | alloy steel[2] | chromium | titanium nitride |
| 8.4-F | alloy steel[2] | chromium | titanium aluminum nitride |
| 8.5-F | alloy steel[2] | chromium | titanium carbonitride |
| 8.6-F | alloy steel[2] | chromium | chromium nitride |
| 8.7-F | alloy steel[2] | chromium | chromium carbonitride |
| 8.8-F | alloy steel[2] | chromium | tungsten nitride |
| 8.9-F | alloy steel[2] | chromium | tungsten carbide |
| 8.10-F | alloy steel[2] | chromium | tungsten/tungsten carbide |
| 8.11-F | alloy steel[2] | chromium | boron carbide |
| 8.12-F | alloy steel[2] | chromium | aluminum chromium nitride |
| 8.13-F | alloy steel[2] | chromium | chromium carbide |
| 8.14-F | alloy steel[2] | chromium | molybdenum disulfide |
| 8.15-F | alloy steel[2] | chromium | molybdenum |
| 8.16-F | alloy steel[2] | chromium | nickel |
| 8.17-F | alloy steel[2] | chromium | rhenium |
| 8.18-F | alloy steel[2] | chromium | tungsten |
| 8.19-F | alloy steel[2] | chromium | chromium |
| 8.20-F | alloy steel[2] | chromium | graphite |
| 8.22-F | alloy steel[2] | chromium | diamond-like carbon |
| 8.23-F | alloy steel[2] | chromium | amorphous carbon |
| 8.24-F | alloy steel[2] | chromium | amorphous hydrogenated carbon |
| 8.25-F | alloy steel[2] | chromium | chromium nitride + zirconium nitride |

[1]Includes austenitic stainless steel, ferritic stainless steel, and martensitic stainless steel, as well as any other types of stainless steel.
[2]Alloy steels include a range of steels having compositions that exceed the limitations of C, Mn, Ni, Mo, Cr, V, Si, and B set for the carbon steels.

What is claimed is:

1. A non-projectile firearm component or accessory, wherein the firearm component or accessory is selected from a frame, a slide, a barrel, a receiver, or any constituent thereof, comprising:
   a. a substrate comprising a base material of the firearm component or accessory, the substrate having an external surface, and the substrate comprising a metal or metal alloy material selected from the group comprising carbon steel, low-carbon steel, alloy steel, tin-free steel, killed steel, semikilled steel, capped steel, rimmed steel, aluminum killed steel, bake hardenable steel, stainless steel, austenitic stainless steel, ferritic stainless steel, martensitic stainless steel, or any combination thereof;
   b. a first layer substantially covering at least a portion of the external surface of the substrate and having corrosion resistance properties, the first layer comprising at least one corrosion resistant metal or metal alloy plating, the first layer having no carbon fiber; and
   c. at least one additional layer applied over at least a portion of the first layer, the at least one additional layer comprising a thin film coating of a wear resistant material selected from the group comprising a ceramic material, metal nitride, a metal carbon nitride, metal carbide, metal sulfide, diamond-like carbon (DLC), a carbon material, or any combination thereof;
   wherein the first layer is different than the at least one additional layer, and wherein the at least one additional layer defines an exposed external surface of the firearm component or accessory, other than an internal surface defined by a bore of a firearm barrel.

2. The firearm component or accessory of claim 1 and wherein the film coating of the at least one additional layer further includes a coating selected from the group comprising zirconium nitride, boron nitride, titanium nitride, titanium aluminum nitride, titanium carbonitride, chromium nitride, chromium carbonitride, tungsten nitride, tungsten carbide, tungsten/tungsten carbide, boron carbide, aluminum chromium nitride, chromium carbide, molybdenum disulfide, molybdenum, nickel, rhenium, tungsten, chromium, graphite, amorphous carbon, amorphous hydrogenated carbon, copper, or any combination thereof.

3. The firearm component of claim 1, wherein the at least one additional layer comprises a thickness of approximately 0.5 μm to approximately 3.0 μm over the first layer.

4. A firearm component or accessory having enhanced corrosion resistance, wherein the firearm component or accessory is selected from a frame, a slide, a barrel, a receiver, or any constituent thereof, comprising:
  a substrate comprising a base material of the firearm component or accessory, the substrate having an external surface and comprising:
    at least one metal material selected from the group comprising carbon steel, low-carbon steel, alloy steel, tin-free steel, killed steel, semikilled steel, capped steel, rimmed steel, aluminum killed steel, bake hardenable steel, stainless steel, austenitic stainless steel, ferritic stainless steel, martensitic stainless steel, or any combination thereof:
  at least one layer of material covering at least a portion of the external surface of the substrate, the at least one layer of material comprising a metal plating comprising a corrosion-resistant first metal or first metal alloy, the at least one layer having no carbon fiber; and
  a coating of a wear resistant material covering at least a portion of the at least one layer of material;
  wherein the coating comprises an exterior surface of the firearm component or accessory, and wherein, when the firearm component or accessory is connected to or integrated in a firearm, the exterior surface of the firearm component or accessory is substantially exposed and unenclosed by other surfaces of the firearm; and
  wherein the coating comprises zirconium nitride, boron nitride, titanium nitride, titanium aluminum nitride, titanium carbonitride, chromium nitride, chromium carbonitride, tungsten nitride, tungsten carbide, tungsten/tungsten carbide, boron carbide, aluminum chromium nitride, chromium carbide, molybdenum disulfide, molybdenum, nickel, rhenium, tungsten, chromium, graphite, diamond-like carbon (DLC), amorphous carbon, amorphous hydrogenated carbon, or any combination thereof.

5. The firearm component or accessory of claim 4, wherein the corrosion-resistant first metal or first metal alloy comprises nickel, chromium, an alloy of nickel, an alloy of chromium, or any combination thereof.

6. The firearm component or accessory of claim 4, wherein the corrosion-resistant first metal or first metal alloy comprises electroless nickel (ENi).

7. The firearm component or accessory of claim 4 and wherein the coating comprises a thin film coating of approximately 0.5 µm to approximately 3.0 µm.

8. The firearm component or accessory of claim 4 and wherein the metal plating comprises a thickness of approximately 0.0005 inches to approximately 0.000079 inches.

9. The firearm component or accessory of claim 4 and wherein the corrosion resistant first metal or metal alloy comprises a nickel plating applied in a thickness of approximately 0.0005 inches to approximately 0.00001 inches.

10. The firearm component of claim 4, wherein the coating of a wear resistant material comprises coating of approximately 0.5 µm to approximately 3.0 µm in thickness.

11. A firearm component or accessory with enhanced corrosion and wear resistance, wherein the firearm component or accessory is selected from a frame, a slide, a barrel, a receiver, or any constituent thereof, comprising:
  a substrate comprising a steel or steel alloy material and having an external surface;
  a first layer of a corrosion resistant nickel metal alloy, chromium, chromium alloy, or a combination thereof covering at least a portion of the external surface of the substrate to provide resistance to corrosion to the substrate; and
  a second layer applied to the substrate and covering at least a portion of the first layer, the second layer comprising a film coating of a metal, metal alloy, metal nitride, metal carbide, metal carbonitride, metal sulfide, diamond-like carbon (DLC), ceramic, carbon material, or combination thereof
  wherein the second layer is applied to the substrate and comprises a thin film coating of approximately 0.5 µm to approximately 3.0 µm over the first layer, and
  wherein the first layer comprises a thickness of approximately 0.0005 inches to approximately 0.000079 inches.

12. The firearm component or accessory of claim 11 and wherein the film coating of the second layer further includes a coating selected from the group comprising zirconium nitride, boron nitride, titanium nitride, titanium aluminum nitride, titanium carbonitricie, chromium nitride, chromium carbonitride, tungsten nitride, tungsten carbide, tungsten/tungsten carbide, boron carbide, aluminum chromium nitride, chromium carbide, molybdenum disulfide, molybdenum, nickel, rhenium, tungsten, chromium, graphite, amorphous carbon, amorphous hydrogenated carbon, copper, or any combination thereof.

13. The firearm component or accessory of claim 11, wherein the substrate comprises at least one metal material selected from the group comprising carbon steel, low-carbon steel, allow steel, tin-free steel, killed steel, semikilled steel, capped steel, rimmed steel, aluminum killed steel, bake hardenable steel, stainless steel, austenitic stainless steel, ferritic stainless steel, martensitic stainless steel, or any combination thereof.

14. A method for enhancing corrosion resistance in a firearm component or accessory, the steps comprising:
  providing a substrate comprising a base material of the firearm component or accessory, the substrate having an external surface;
  covering the at least a portion of the external surface of the substrate with at least one corrosion resistant material layer comprising at least one corrosion-resistant first metal or first metal alloy; and
  vapor depositing at least a second layer over the external surface of the substrate, the second layer comprising at least one constituent selected from a metal nitride, a metal carbonitride, a metal carbide, a metal sulfide, graphite, diamond-like carbon (DLC), ceramics or any combination thereof;
  wherein the at least one corrosion resistant layer comprises a different material from the second layer, wherein the second layer comprises an exterior surface of the firearm component or accessory other than an internal surface defined by a bore of a firearm barrel, and wherein the firearm component or firearm accessory is selected from the group consisting of: a frame, a slide, a ramp, a chamber, a barrel, a choke, a bolt, a bolt sleeve, a bolt lock, a sear, a lug, a receiver, a dust cover, a magazine, a cylinder, a hammer, a trigger mechanism, a safety mechanism, an ejector mechanism, an extractor, a guide rod, a spring housing, a rail, a firing mechanism, a decocking device, a stock, a sight, a sling swivel and a suppressor.

15. A firearm component enhanced by the method of claim 14.

16. The firearm component, of claim 14, wherein the vapor depositing step deposits a thin film coating of approximately 0.5 µm to approximately 3.0 µm in thickness.

17. A firearm component or accessory having enhanced corrosion resistance, wherein the firearm component or accessory is selected from a frame, a slide, a barrel, a receiver, or any constituent thereof, comprising:
- a substrate comprising a base material of the firearm component or accessory, the substrate having an external surface and comprising:
- at least one metal material selected from the group comprising carbon steel, low-carbon steel, alloy steel, tin-free steel, killed steel, semikilled steel, capped steel, rimmed steel, aluminum killed steel, bake hardenable steel, stainless steel, austenitic stainless steel, ferritic stainless steel, martensitic stainless steel, or any combination thereof:
- at least one layer of material covering at least a portion of the external surface of the substrate, the at least one layer of material comprising a metal plating comprising a corrosion-resistant first metal or first metal alloy, the at least one layer having no carbon fiber; and
- a coating of a wear resistant material covering at least a portion of the at least one layer of material;
- wherein the coating comprises an exterior surface of the firearm component or accessory, and wherein, when the firearm component or accessory is connected to or integrated in a firearm, the exterior surface of the firearm component or accessory is substantially exposed and unenclosed by other surfaces of the firearm, and
- wherein the corrosion-resistant first metal or first metal alloy comprises electroless nickel (ENi).

18. The firearm component or accessory of claim 17, wherein the coating comprises at least one constituent selected from a second metal, a second metal alloy, a metal nitride, a metal carbonitride, a metal carbide, a metal sulfide, graphite, diamond-like carbon (DLC), ceramics or any combination thereof.

19. The firearm component or accessory of claim 17, wherein the coating comprises zirconium nitride, boron nitride, titanium nitride, titanium aluminum nitride, titanium carbonitride, chromium nitride, chromium carbonitride, tungsten nitride, tungsten carbide, tungsten/tungsten carbide, boron carbide, aluminum chromium nitride, chromium carbide, molybdenum disulfide, molybdenum, nickel, rhenium, tungsten, chromium, graphite, diamond-like carbon (DLC), amorphous carbon, amorphous hydrogenated carbon, copper, or any combination thereof.

20. The firearm component or accessory of claim 17, wherein the coating comprises zirconium nitride, boron nitride, titanium nitride, titanium aluminum nitride, titanium carbonitride, chromium nitride, chromium carbonitride, tungsten nitride, tungsten carbide, tungsten/tungsten carbide, boron carbide, aluminum chromium nitride, chromium carbide, molybdenum disulfide, molybdenum, nickel, rhenium, tungsten, chromium, graphite, diamond-like carbon (DLC), amorphous carbon, amorphous hydrogenated carbon, copper, or any combination thereof.

21. The firearm component or accessory of claim 17, wherein the coating comprises a thickness of approximately 0.5 μm to approximately 3.0 μm.

22. A firearm component or accessory having enhanced corrosion resistance, wherein the firearm component or accessory is selected from a frame, a slide, a barrel, a receiver, or any constituent thereof, comprising:
- a substrate comprising a base material of the firearm component or accessory, the substrate having an external surface and comprising:
- at least one metal material selected from the group comprising carbon steel, low-carbon steel, alloy steel, tin-free steel, killed steel, semikilled steel, capped steel, rimmed steel, aluminum killed steel, bake hardenable steel, stainless steel, austenitic stainless steel, ferritic stainless steel, martensitic stainless steel, or any combination thereof:
- at least one layer of material covering at least a portion of the external surface of the substrate, the at least one layer of material comprising a metal plating comprising a corrosion-resistant first metal or first metal alloy, the at least one layer having no carbon fiber; and
- a coating of a wear resistant material covering at least a portion of the at least one layer of material;
- wherein the coating comprises an exterior surface of the firearm component or accessory, and wherein, when the firearm component or accessory is connected to or integrated in a firearm, the exterior surface of the firearm component or accessory is substantially exposed and unenclosed by other surfaces of the firearm, and
- wherein the metal plating comprises a thickness of approximately 0.0005 inches to approximately 0.000079 inches.

23. The firearm component or accessory of claim 22, wherein the coating comprises zirconium nitride, boron nitride, titanium nitride, titanium aluminum nitride, titanium carbonitride, chromium nitride, chromium carbonitride, tungsten nitride, tungsten carbide, tungsten/tungsten carbide, boron carbide, aluminum chromium nitride, chromium carbide, molybdenum disulfide, molybdenum, nickel, rhenium, tungsten, chromium, graphite, diamond-like carbon (DLC), amorphous carbon, amorphous hydrogenated carbon, copper, or any combination thereof.

24. The firearm component or accessory of claim 22, wherein the coating comprises a thickness of approximately 0.5 μm to approximately 3.0 μm.

25. The firearm component or accessory of claim 22, wherein the coating comprises at least one constituent selected from a second metal, a second metal alloy, a metal nitride, a metal carbonitride, a metal carbide, a metal sulfide, graphite, diamond-like carbon (DLC), ceramics or any combination thereof.

26. A firearm component or accessory having enhanced corrosion resistance, wherein the firearm component or accessory is selected from a frame, a slide, a barrel, a receiver, or any constituent thereof, comprising:
- a substrate comprising a base material of the firearm component or accessory, the substrate having an external surface and comprising:
- at least one metal material selected from the group comprising carbon steel, low-carbon steel, alloy steel, tin-free steel, killed steel, semikilled steel, capped steel, rimmed steel, aluminum killed steel, bake hardenable steel, stainless steel, austenitic stainless steel, ferritic stainless steel, martensitic stainless steel, or any combination thereof:
- at least one layer of material covering at least a portion of the external surface of the substrate, the at least one layer of material comprising a metal plating comprising a corrosion-resistant first metal or first metal alloy, the at least one layer having no carbon fiber; and
- a coating of a wear resistant material covering at least a portion of the at least one layer of material;
- wherein the coating comprises an exterior surface of the firearm component or accessory, and wherein, when the firearm component or accessory is connected to or integrated in a firearm, the exterior surface of the firearm component or accessory is substantially exposed and unenclosed by other surfaces of the firearm; and wherein the corrosion resistant first metal or metal alloy comprises a nickel plating applied in a thickness of approximately 0.0005 inches to approximately 0.00001 inches.

27. The firearm component or accessory of claim 26, wherein the coating comprises zirconium nitride, boron nitride, titanium nitride, titanium aluminum nitride, titanium carbonitride, chromium nitride, chromium carbonitride, tungsten nitride, tungsten carbide, tungsten/tungsten carbide, boron carbide, aluminum chromium nitride, chromium carbide, molybdenum disulfide, molybdenum, nickel, rhenium, tungsten, chromium, graphite, diamond-like carbon (DLC), amorphous carbon, amorphous hydrogenated carbon, copper, or any combination thereof.

28. The firearm component or accessory of claim 26, wherein the coating comprises a thickness of approximately 0.5 μm to approximately 3.0 μm.

29. The firearm component or accessory of claim 26, wherein the coating comprises at least one constituent selected from a second metal, a second metal alloy, a metal nitride, a metal carbonitride, a metal carbide, a metal sulfide, graphite, diamond-like carbon (DLC), ceramics or any combination thereof.

* * * * *